United States Patent [19]

Sauer

[11] 4,232,962
[45] Nov. 11, 1980

[54] FORMAT ASSEMBLER FOR PHOTOGRAPHIC PRINTER

[75] Inventor: Mark R. Sauer, Williamson, N.Y.

[73] Assignee: UNL Incorporated, Webster, N.Y.

[21] Appl. No.: 28,345

[22] Filed: Apr. 9, 1979

[51] Int. Cl.³ .............................................. G03B 27/44
[52] U.S. Cl. ........................................ 355/46; 355/54; 355/71
[58] Field of Search ..................... 355/45, 46, 71, 54

[56] References Cited

U.S. PATENT DOCUMENTS

| | | | |
|---|---|---|---|
| 3,169,441 | 2/1965 | Johnson | 355/54 |
| 3,315,561 | 4/1967 | Boutigue | 355/45 X |
| 3,511,565 | 5/1970 | Harmon, Jr. et al. | 355/56 |
| 3,516,741 | 6/1970 | Thaddey | 355/88 |
| 3,537,790 | 11/1970 | Ferguson | 355/41 |
| 3,617,125 | 11/1971 | Sobottke et al. | 355/46 |
| 3,689,149 | 9/1972 | Livingood | 355/54 X |
| 3,951,545 | 4/1976 | Lucht | 355/46 |

Primary Examiner—Richard A. Wintercorn
Attorney, Agent, or Firm—Stonebraker, Shepard & Stephens

[57] ABSTRACT

A format assembler allows an automatic photographic printer to form any desired size, number, and orientation of images to be juxtaposed on a continuous length of print paper with minimal paper waste. This is done with a carriage 10 that moves along a path parallel with the printing plane and extending in the direction of paper advance between the print paper and interchangeable lens modules with different lens arrays. An interchangeable mask 11 carried on the carriage has a shape that allows positioning the mask along the path to block light from predetermined lenses of any array. The mask shape and positioning allows successive exposures through preselected lenses of different lens arrays of a paper area exposable by any one of the lens arrays without advancing the paper. A control system controls the position of the carriage in programmed relation to movement of the other components of the printer.

8 Claims, 5 Drawing Figures

FORMAT ASSEMBLER FOR PHOTOGRAPHIC PRINTER

BACKGROUND OF THE INVENTION

Automatic photographic printers have used interchangeable lens modules with different lens arrays working in cooperation with a paper advance and a film negative advancer and orienter to form different numbers, sizes, and orientations of prints on a continuous length of print paper. The users of these machines seek increasing variability or versatility in arranging different sizes and numbers of images on the print paper without wasting paper, and this need has led to the invention.

The invention suggests a format assembler that includes an interchangeable mask located by a movable carriage in cooperation with a programmed system that controls the movements of other components of the printer to achieve unlimited versatility in a simple and economical way. The invention aims at a low cost, practical, and reliable way of satisfying the need for any desired arrangement of different sized images positioned for minimal waste of print paper.

SUMMARY OF THE INVENTION

The inventive format assembler applies to a photographic printer having a control system for controlling component movements that include movements of interchangeable lens modules with different lens arrays, a paper advance along a printing plane, and a film negative advancer and orienter. It includes a carriage movable along a path parallel with the printing plane between the lens modules and the printing plane and a mask carried on the carriage to be interchangeable with other masks. The mask has a predetermined shape related to light transmitted through the lens arrays, and the carriage is positioned in a predetermined plurality of positions along the path for locating the mask in different positions wherein the mask blocks light transmitted through different predetermined lenses of the lens arrays. The mask shape and different mask positions are arranged to allow successive exposures through preselected lenses of different lens arrays of a paper area exposable by any one of said lens arrays without advancing the paper, and the control system includes means for controlling the position of the carriage in programmed relation to the movements of other components of the printer.

DRAWINGS

DETAILED DESCRIPTION

The inventive format assembler cooperates with several existing components of automatic photographic printers. These include: interchangeable lens modules with different lens arrays and drive mechanisms for automatically and interchangeably positioning the lens modules in the light path for printing purposes; a paper advance for moving a continuous length of printing paper longitudinally along a printing plane; and a film negative advancer and orienter that can frame a desired negative on a strip of negatives and orient it either longitudinally or transversely for imaging on the print paper. Such printers have control systems that are programmed to control the movements of these components in a sequence of steps that produces the desired number, size, and orientation of images on the print paper. Each of the lens modules has a lens array that prints either a single or multiple number of images across the full width of the print paper over a predetermined longitudinal length of print paper. The paper advances in appropriate amount for each exposure, and lens module selection and negative orientation determines the number and orientation of prints made. Lens decks for such printers typically include an assembly of six modules, each having a different lens array; and lens decks are interchangeable to form a large variety of possibilities.

Reticulating masks movable longitudinally of the print paper along the printing plane and extending across the print paper have been used to block off light from some of the lenses of an array, but these work only where images can be divided along a line transverse to the paper advance. Lateral or side by side division of images has been done with four pivoted masks operated by solenoids to divide the potential image area into four quadrants that can be masked or unmasked as desired. Such an arrangement is mechanically cumbersome and unreliable and limits the masking possibilities to four quadrants.

Figure 1:
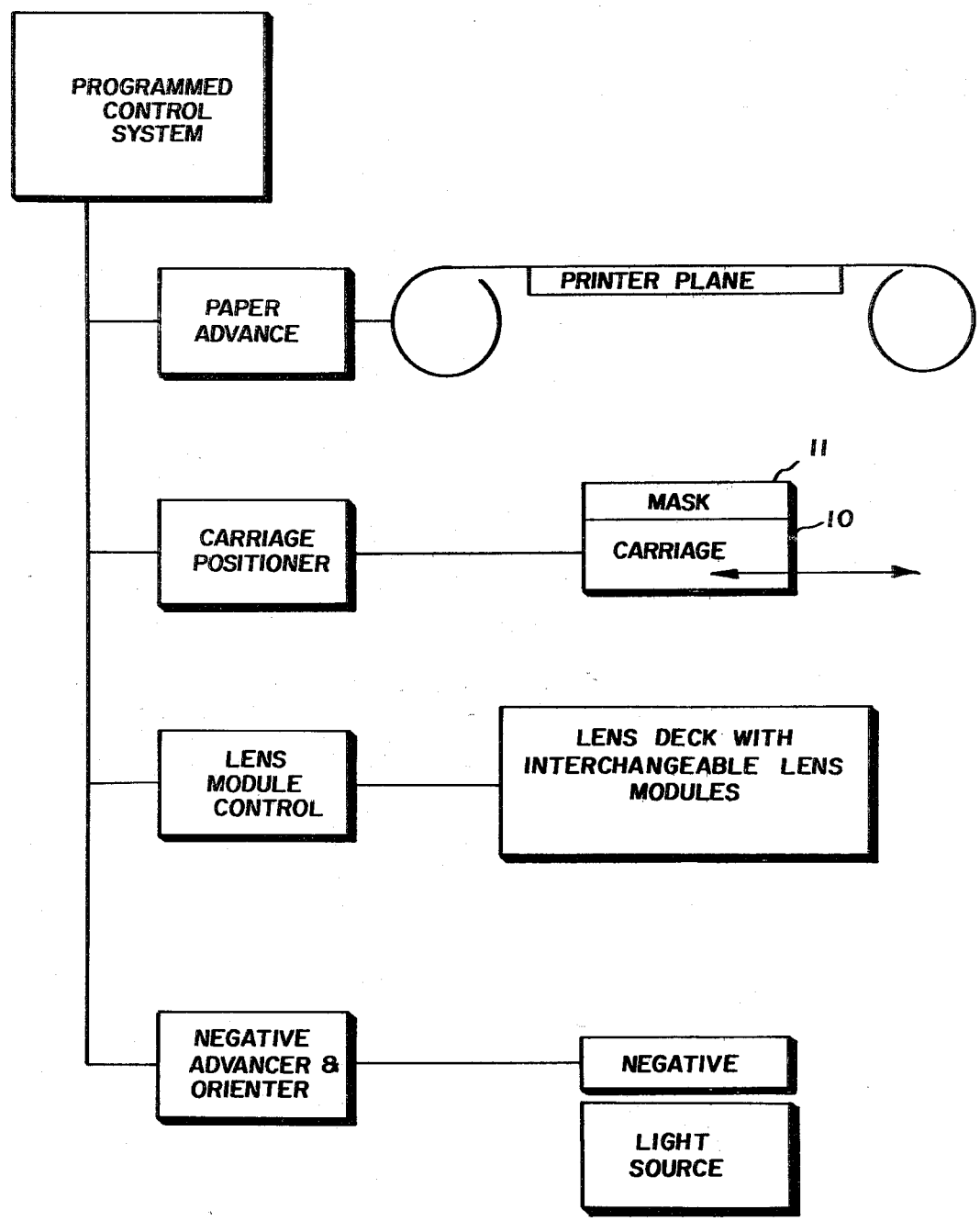
FIG. 1 is a schematic diagram of a preferred embodiment of the inventive format assembler applied to a photographic printer.

The format assembler of this invention vastly increases the versatility with a simple arrangement that involves a carriage 10 with an interchangeable mask 11 movable along a path parallel with the printing plane and extending in the direction of paper advance as shown schematically in FIG. 1. It allows not only both longitudinal and lateral image division but also preselected exposure through any lens or lenses of any lens array in either negative orientation for full implementation of any printing possibility.

Figure 2:
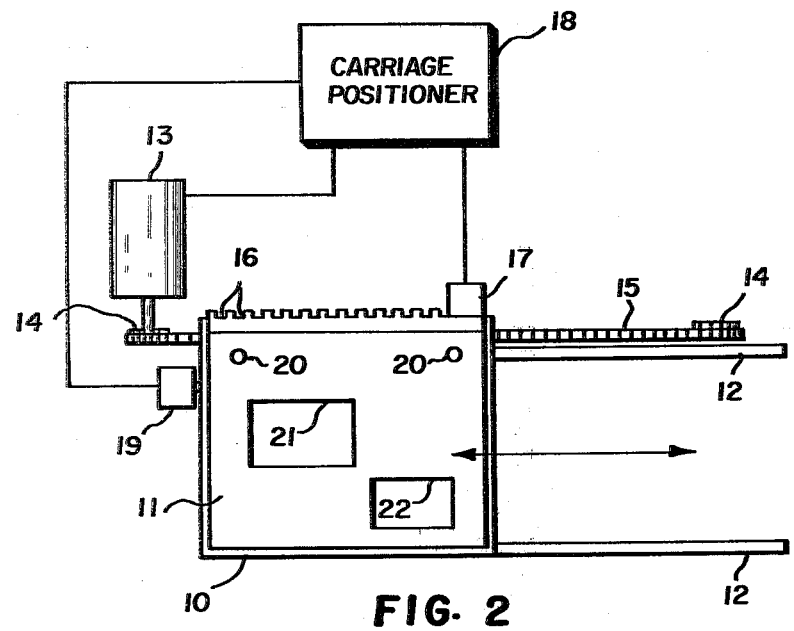
FIG. 2 is a partially schematic plan view of a preferred embodiment of a mask and carriage positioner for use in the invention.

As schematically shown in FIG. 2, carriage 10 is preferably an open frame movable along a guide track 12 that extends in the direction of paper advance. A reversible stepping motor 13 drives sprocket 14 and chain 15 attached to carriage 10 to position carriage 10 in any desired location along track 12. Accuracy and versatility in positioning carriage 10 is assured by a linear series of openings or notches 16 disposed on carriage 10 to pass between a light source (not shown) and a photodetector 17 as carriage 10 moves. Photodetector 17 views the light intersected by notches 16 and electrically communicates with carriage positioner control 18 to provide feedback determining the position of carriage 10 for accurate location in any of a multitude of positions along track 12. Other feedback arrangements can also be used, such as a row of bore holes, a transparent strip printed with opaque bars, or even an electromechanical device; but the illustrated arrangement is preferred for simplicity and reliability.

Carriage 10 preferably has a home position illustrated in FIG. 2 where it is outside the light path to allow full and unmasked printing. The home position of carriage 10 also preferably includes a switch 19 in electrical communication with carriage positioner 18 for detecting the arrival home of carriage 10 and for zeroing the feedback system so that any errors do not accumulate. Carriage 10 then advances from the illustrated home position with a fresh location count detected by photodetector 17 monitoring the light passing through teeth 16.

Figure 3:
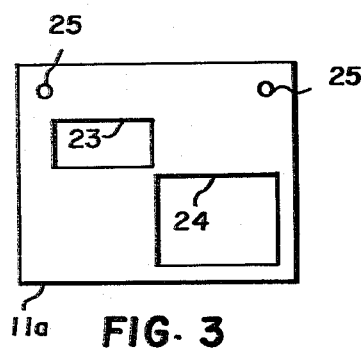
FIG. 3 is a plan view of an alternative mask for use in the invention.

Carriage 10 has a pair of registration pins 20 that position mask 11 accurately in place on carriage 10. Mask 11 has apertures 21 and 22 that are formed relative to the light transmitted through lens arrays to block out preselected images while exposing other images with light transmitted through one of its openings 21 or 22. Mask 11a of FIG. 3 has different shaped apertures 23 and 24 to show that different masks can be used with carriage 10 simply by fitting mask holes 25 over registration pins 20. Mask apertures 21-24 illustrate only 2 of many possibilities. Three or more apertures can be made in a single mask, and mask openings can be formed to transmit or block light from any lens or combination of lenses of any lens array, simply by properly positioning the proper shaped mask.

Figure 4:
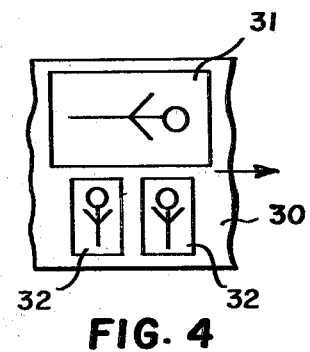
FIGS. 4 and 5 are partially schematic plan views of results achievable with the masks of FIGS. 2 and 3.
Figure 5:
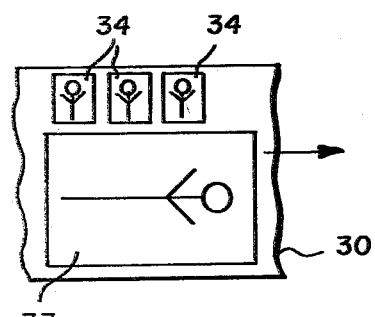

Image division such as schematically illustrated in FIG. 4 can be achieved with mask 11 of FIG. 2. By positioning carriage 10 to locate mask 11 in one position relative to a lens array that can form two 5×7 images side by side across a width of print paper 30, mask 11 blocks out the light from one of the images and passes the light from the other image through aperture 21 so that a 5×7 image 31 is formed along one side of print paper 30. Then, without advancing print paper 30, carriage 10 moves to locate mask aperture 22 alongside the previous position of mask aperture 21, and a different lens module moves a different lens array into the light path. The negative is turned 90°, and a second exposure of two 3×5 prints 32 is formed alongside the 5×7 print 31, but positioned on the other longitudinal half of the print paper. Another illustrative possibility is shown in FIG. 5 where a relatively large image 33 (or a plurality of images having the same size) is printed through aperture 24 of mask 11a, which then moves to a new location for printing smaller images 34 in the space available alongside image 33.

Image division or splitting with the inventive format asembler can be made not only along the longitudinal center line of print paper 30, but also lines that are one-third, one-quarter, or some other spacing from either edge of print paper 30. Images can also be divided along lines transverse to the paper advance; a negative can be changed between successive exposures of a paper area, and image division is limited only by the available lens arrays. Images can be oriented either longitudinally or transversely of the print paper, and any desired number or combination of any lenses of a lens array can be masked out by mask 11 so that images can be arranged on paper 30 in any desired way. A programmed control system easily makes any image format repeatable, and manual control is also possible.

The inventive format assembler can also work in cooperation with a reticulating mask that moves longitudinally of the print paper and extends transversely across the print paper near the printing plane. Such a reticulating mask can be programmed to cut off a trailing image or row of images if desired. The same result could be achieved by a properly shaped mask 11; but for some circumstances, mask substitution could be avoided this way.

I claim:

1. A format assembler for a photographic printer having a control system controlling component movements that include movements of interchangeable lens modules with different lens arrays, a paper advance along a printing plane, and a film negative advancer and orienter, said format assembler comprising:
   a. a carriage movable along a path parallel with said printing plane and extending in the direction of said paper advance between said lens modules and said printing plane;
   b. a mask carried in a fixed position on said carriage to be interchangeable with other masks having different shapes;
   c. said mask having a predetermined shape related to light transmitted through preselected lenses of said lens arrays;
   d. means for positioning said carriage in a predetermined plurality of positions along said path for locating said mask in different positions wherein said mask blocks said light transmitted through different preselected lenses of said lens arrays;
   e. said predetermined shape of said mask being arranged to block off light through preselected lenses of one lens array when said mask is in a first position to allow exposure of one longitudinal side of a paper area and then to block off light transmitted through preselected lenses of a second lens array when said mask is in a second position to allow a successive exposure on the opposite longitudinal side of said paper area without advancing said paper; and
   f. said control system including means for controlling said positioning of said carriage in programmed relation to said component movements.

2. The assembler of claim 1 wherein said carriage has registration pins, and a plurality of said masks are interchangeably mountable on said registration pins.

3. The assembler of claim 1 wherein said positioning means for said carriage includes a light source, a linear series of openings arranged on said carriage to intersect light from said source, and a photodetector viewing said intersected light and communicating with said control system for determining the location of said carriage along said path.

4. The assembler of claim 3 wherein said carriage has a home position where said mask does not block light, and a switch operated by said carriage at said home position communicates with said control system for zeroing said carriage.

5. The assembler of claim 1 wherein said positioning means for said carriage includes a reversible motor and a chain drive.

6. The assembler of claim 5 wherein said carriage has registration pins, and a plurality of said masks are interchangeably mountable on said registration pins.

7. The assembler of claim 6 wherein said positioning means for said carriage includes a light source, a linear series of openings arranged on said carriage to intersect light from said source, and a photodetector viewing said intersected light and communicating with said control system for determining the location of said carriage along said path.

8. The assembler of claim 7 wherein said carriage has a home position where said mask does not block light, and a switch operated by said carriage at said home position communicates with said control system for zeroing said carriage.

* * * * *